2 Sheets--Sheet 1.

A. F. CUSHMAN.

Chucks for Holding Drills.

No. 134,259. Patented Dec. 24, 1872.

Witnesses.
Harry King.
W. H. Dodge.

Inventor:
Austin F. Cushman,
by Dodge & Son
Attys.

A. F. CUSHMAN.
Chucks for Holding Drills.
No. 134,259.  Patented Dec. 24, 1872.
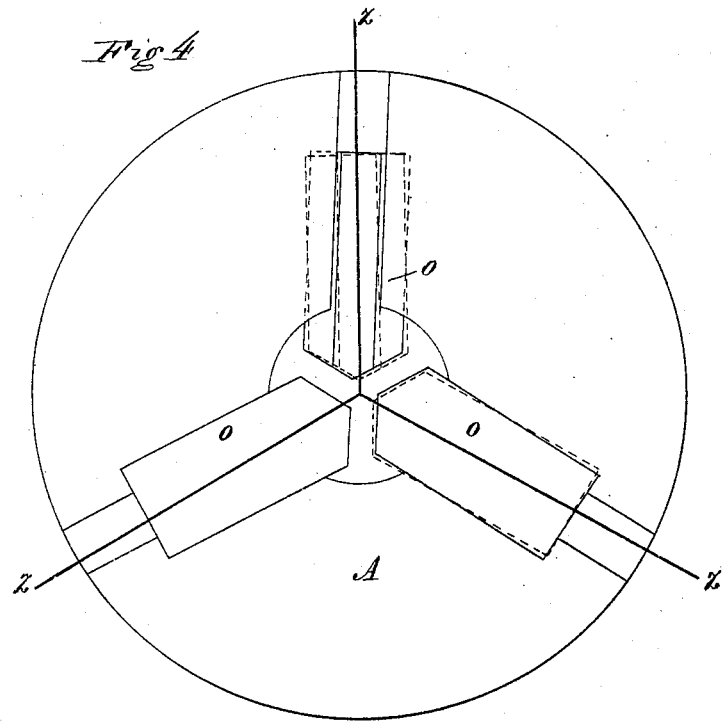
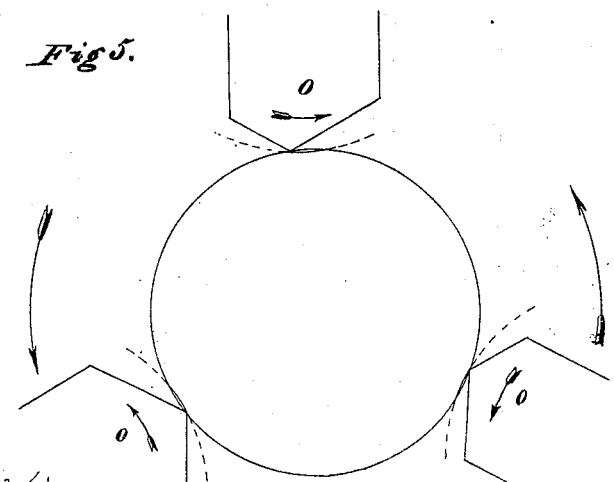

UNITED STATES PATENT OFFICE.

AUSTIN F. CUSHMAN, OF HARTFORD, CONNECTICUT.

IMPROVEMENT IN CHUCKS FOR HOLDING DRILLS.

Specification forming part of Letters Patent No. 134,259, dated December 24, 1872.

*To all whom it may concern:*

Be it known that I, AUSTIN F. CUSHMAN, of Hartford, in the county of Hartford and State of Connecticut, have invented certain Improvements in Drill-Chucks, of which the following is a specification:

My invention consists in constructing a chuck in such a manner that the points of its jaws, when closed upon the article to be held, shall strike or seize said article a little to one side instead of in a direct line with the center of the groove in which the jaws slide, as has heretofore been the custom; and in so arranging or constructing the jaws and their ways or grooves as to permit the former to swing slightly in the latter, for the purpose of causing the jaws to act as cams or eccentrics, and thus increase their hold upon the drill or article to be held. It further consists in constructing the scroll-plate with a flange or rim at right angles to the body of the plate to project over the edge of the body and cover the outward ends of the grooves in which the jaws slide, all as hereinafter explained.

Figure 1:
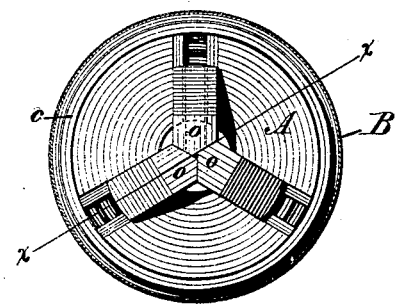
Figure 2:
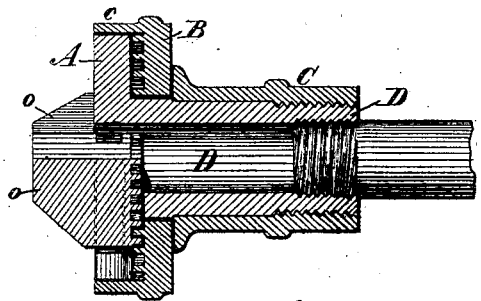
Figure 3:

Figure 1 is a front face or end view of my improved chuck. Fig. 2 is a longitudinal section of the same on line $x\,x$ of Fig. 1. Fig. 3 is a transverse section of the scroll-plate, and Figs. 4 and 5 are diagrams illustrating the principle or mode of operation of the jaws.

In constructing chucks of this class it has been customary to make the jaws with V-shaped points to grasp the drill or article to be held, and then to arrange the jaws in radial grooves, so that when they moved inward the points of all the jaws would meet exactly at the center.

In constructing my improved chuck I make the jaws $o$ with their V-points a little to one side of a line passing through their axis in the line of their movement, as represented by an enlarged view in Fig. 5. When thus constructed and arranged to move in radial grooves in the usual manner, it will be seen that the points of the jaws, instead of meeting at the center, will each be thrown a little to one side of the center, as shown in Fig. 1. I also make the jaws of such a width, where they bear in their grooves or ways, as to permit them to swing laterally a very little therein, so that when they are tightened up on the drill, and the chuck rotated, their points will swing around, as indicated by the dotted lines in Fig. 5, thus throwing the points inward nearer the center, and thus cause them to tighten their hold upon the article, the jaws swinging in the direction indicated by the arrows marked on them, while the chuck as a whole revolves in the opposite direction, as indicated by the larger arrows outside. The same result may be accomplished by moving the V-points in the usual manner, and then making the ways or grooves in which the jaws move slightly oblique instead of on a radial line, as represented in Fig. 4, in which the line $z$ indicates the position of the grooves as ordinarily constructed, while the jaws $o$ with their grooves are shown set oblique, as above described. By this arrangement the V-points of the jaws will be thrown out of line or to one side, the same as in the former case. This plan, which is but a modification of the other, I do not consider as good, for the reason that the position of the jaws and their grooves being thrown more nearly in the line of rotation of the chuck, are more easily forced back in their grooves, they not being crowded and locked so squarely against their sides in the grooves, and consequently throwing more strain on their teeth and the scroll. This feature of arranging the points of the jaws eccentrically I consider by far the most important part of my invention.

The body A of the chuck consists of a face-plate having grooves for the jaws, from the rear face of which plate extends a tubular portion, D, which is fitted upon the arbor of the lathe in any suitable manner. The scroll-plate B is formed with a central opening of such a size as to permit the plate to be slipped onto the tubular portion D of the body A, as shown in Fig. 2, and thus bring the scroll on its inner face into contact with the teeth of the jaws, as usual. This scroll-plate B is provided around its outer edge with a flange or rim, $c$, as shown in Fig. 3, this rim, being made of the proper width to fit over the periphery of the face-plate A and come flush with its front face, as shown in Fig. 2, thus covering and protecting the outer ends of the grooves in which the jaws move. A sleeve, C, is then provided to fit over the tubular portion D, upon which it is screwed or otherwise secured, as represented in Fig. 2, for the purpose of holding the scroll-plate in place. It is obvious that instead of this sleeve C the scroll-plate may be provided with a rearwardly-projecting flange or collar, in which a set-screw or key may be secured, and made to engage in an annular groove or recess formed in the external surface of the portion D, and thus secure the scroll-plate B in place; but I prefer the collar or sleeve C, for the reason that it bears all around against the back side of the scroll-plate, and thus holds it firmly and truly in position.

By this method of constructing a chuck it is rendered very simple, having but few parts, and at the same time is very efficient, it being rendered self-tightening when in operation.

I am aware that chucks have been made in which the jaws were pivoted and caused to clasp the article by a swinging movement, the jaws in such cases turning on fixed points, but not having a longitudinal movement endwise; and I do not claim such as my invention; but Having fully described my improved chuck, what I do claim is—

1. A chuck having its jaws arranged to slide longitudinally in grooves, and to bear against the article to be held eccentrically or at one side of a radial line from the center, substantially as described.

2. The sliding jaws o, so constructed and arranged as to have a slight swinging movement in their grooves or ways, for the purpose of causing them to tighten on the article held after said jaws have been adjusted longitudinally, as set forth.

3. The scroll-plate B, provided with the projecting flange or rim c, arranged to cover the grooves in the periphery of the face-plate A, substantially as described.

AUSTIN F. CUSHMAN.

Witnesses:
E. L. CUSHMAN,
CHARLES H. HAWLEY.